US010654953B2

(12) United States Patent
McDaniel et al.

(10) Patent No.: US 10,654,953 B2
(45) Date of Patent: May 19, 2020

(54) METHODS OF PREPARING A CATALYST

(71) Applicant: Chevron Phillips Chemical Company LP, The Woodlands, TX (US)

(72) Inventors: Max P. McDaniel, Bartlesville, OK (US); Eric D. Schwerdtfeger, Bartlesville, OK (US); Jeremy M. Praetorious, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 202 days.

(21) Appl. No.: 15/847,129

(22) Filed: Dec. 19, 2017

(65) Prior Publication Data
US 2018/0186908 A1 Jul. 5, 2018

Related U.S. Application Data

(60) Provisional application No. 62/440,188, filed on Dec. 29, 2016.

(51) Int. Cl.
*C08F 110/02* (2006.01)
*C08F 4/18* (2006.01)
*C08F 4/24* (2006.01)

(52) U.S. Cl.
CPC .............. *C08F 110/02* (2013.01); *C08F 4/18* (2013.01); *C08F 4/24* (2013.01)

(58) Field of Classification Search
CPC . B01J 21/06; B01J 21/063; B01J 21/08; B01J 21/26; C08F 110/02; C08F 4/18; C08F 4/24
See application file for complete search history.

(56) References Cited

U.S. PATENT DOCUMENTS

| | | |
|---|---|---|
| 2,503,913 A | 4/1950 | Kimberlin, Jr. et al. |
| 3,119,569 A | 1/1964 | Baricordi |
| 3,248,179 A | 4/1966 | Norwood |
| 3,622,521 A | 11/1971 | Hogan et al. |
| 3,780,011 A | 12/1973 | Pullukat et al. |
| 3,875,079 A | 4/1975 | Witt |
| 3,882,096 A | 5/1975 | Shida et al. |
| 3,887,494 A | 6/1975 | Dietz |
| 3,900,457 A | 8/1975 | Witt |
| 3,970,613 A | 7/1976 | Goldie et al. |
| 3,976,632 A | 8/1976 | Delap |
| 4,041,224 A | 8/1977 | Hoff et al. |
| 4,053,436 A | 10/1977 | Hogen et al. |
| 4,119,569 A | 10/1978 | Dietz |
| 4,169,926 A | 10/1979 | McDaniel |
| 4,186,260 A * | 1/1980 | Dietz ............... B01J 23/26 502/236 |
| 4,190,457 A | 2/1980 | McDaniel |
| 4,218,345 A | 8/1980 | Hoff et al. |
| 4,247,421 A | 1/1981 | McDaniel et al. |
| 4,280,141 A | 7/1981 | McCann et al. |
| 4,294,724 A | 10/1981 | McDaniel |
| 4,296,001 A | 10/1981 | Hawley |
| 4,299,731 A | 11/1981 | McDaniel et al. |
| 4,312,967 A | 1/1982 | Norwood et al. |
| 4,345,055 A | 8/1982 | Hawley |
| 4,368,303 A | 1/1983 | McDaniel |
| 4,402,864 A | 9/1983 | McDaniel |
| 4,405,501 A | 9/1983 | Witt |
| 4,405,768 A | 9/1983 | McDaniel |
| 4,424,320 A | 1/1984 | McDaniel |
| 4,434,243 A | 2/1984 | Martin |
| 4,442,275 A | 4/1984 | Martin |
| 4,446,243 A | 5/1984 | Chester et al. |
| 4,501,885 A | 2/1985 | Sherk et al. |
| 4,547,557 A | 10/1985 | McDaniel |
| 4,559,394 A | 12/1985 | McDaniel |
| 4,588,790 A | 5/1986 | Jenkins, III et al. |
| 4,832,022 A | 5/1989 | Tjulkov et al. |
| 4,981,831 A | 1/1991 | Knudsen et al. |
| 5,115,053 A | 5/1992 | Knudsen et al. |
| 5,183,792 A | 2/1993 | Wang et al. |
| 5,231,066 A | 7/1993 | Rekers et al. |

(Continued)

FOREIGN PATENT DOCUMENTS

| | | |
|---|---|---|
| AL | 9311173 A1 | 6/1993 |
| EP | 0033953 A2 | 8/1981 |

(Continued)

OTHER PUBLICATIONS

Foreign communication from a related application—Korean Office Action, 10-2014-7015433, dated May 18, 2018, with translation, 16 pages.
Filing receipt and specification for patent application entiteld "Methods of Preparing a Catalyst," by Max McDaniel, et al., filed Apr. 16, 2018 as U.S. Appl. No. 15/953,927.
Filing receipt and specification for patent application entiteld "Methods of Preparing a Catalyst," by Max McDaniel, et al., filed Apr. 16, 2018 as U.S. Appl. No. 15/953,930.
Office Action (Final) dated Apr. 26, 2018 (35 pages), U.S. Appl. No. 15/298,540, filed Oct. 20, 2016.
Foreign communication from a related application—Korean Office Action, PCT/US2012/064986, dated May 18, 2018, with translation, 16 pages.

(Continued)

*Primary Examiner* — Anthony J Zimmer
(74) *Attorney, Agent, or Firm* — Conley Rose, P.C.

(57) ABSTRACT

A method of preparing a catalyst support comprising contacting an acid-soluble titanium-containing compound with an acid to form a first mixture; contacting the first mixture with an alkali metal silicate to form a hydrogel which has a silica content of from about 18 wt. % to about 35 wt. % based on the total weight of the hydrogel; contacting the hydrogel with an alkaline solution to form an aged hydrogel; washing the aged hydrogel to form a washed hydrogel; and drying the washed hydrogel to produce a titanium-containing-silica support wherein the support has a pore volume equal to or greater than about 1.4 cm³/g.

27 Claims, No Drawings

(56) References Cited

U.S. PATENT DOCUMENTS

| | | | |
|---|---|---|---|
| 5,284,811 A * | 2/1994 | Witt | C08F 10/00 502/210 |
| 5,284,926 A | 2/1994 | Benham et al. | |
| 5,352,749 A | 10/1994 | DeChellis et al. | |
| 5,426,082 A | 6/1995 | Marsden | |
| 5,436,304 A | 7/1995 | Griffin et al. | |
| 5,455,314 A | 10/1995 | Burns et al. | |
| 5,478,898 A | 12/1995 | Standaert | |
| 5,565,175 A | 10/1996 | Hottovy et al. | |
| 5,575,979 A | 11/1996 | Hanson | |
| 5,576,262 A | 11/1996 | Denton | |
| 5,599,762 A | 2/1997 | Denton | |
| 5,726,260 A * | 3/1998 | Derleth | B01J 23/26 526/106 |
| 5,914,291 A | 6/1999 | Marsden et al. | |
| 5,965,675 A | 10/1999 | Kellum et al. | |
| 5,973,083 A * | 10/1999 | Matsushita | C08F 10/00 526/129 |
| 6,200,920 B1 | 3/2001 | Debras et al. | |
| 6,239,235 B1 | 5/2001 | Hottovy et al. | |
| 6,262,191 B1 | 7/2001 | Hottovy et al. | |
| 6,313,061 B1 * | 11/2001 | Denton | B01J 37/0036 502/235 |
| 6,423,663 B2 | 7/2002 | Debras | |
| 6,482,901 B1 | 11/2002 | Debras | |
| 6,489,428 B1 | 12/2002 | Debras et al. | |
| 6,559,090 B1 * | 5/2003 | Shih | C08F 10/02 502/118 |
| 6,624,324 B2 | 9/2003 | Iwakura et al. | |
| 6,657,023 B2 | 12/2003 | Bergmeister et al. | |
| 6,707,498 B1 | 3/2004 | Toma et al. | |
| 6,833,415 B2 | 12/2004 | Kendrick et al. | |
| 6,855,781 B2 | 2/2005 | Bergmeister et al. | |
| 7,088,394 B2 | 8/2006 | Rossi et al. | |
| 7,262,259 B2 | 8/2007 | Katzen et al. | |
| 7,375,169 B1 | 5/2008 | Smith et al. | |
| 7,390,395 B2 | 6/2008 | Elomari | |
| 7,700,516 B2 | 4/2010 | McDaniel et al. | |
| 7,803,736 B2 | 9/2010 | Rohde et al. | |
| 7,981,832 B2 | 7/2011 | McDaniel et al. | |
| 8,183,173 B2 | 5/2012 | McDaniel et al. | |
| 8,372,771 B2 | 2/2013 | Benham et al. | |
| 9,023,967 B2 | 5/2015 | Yu et al. | |
| 9,096,699 B2 | 8/2015 | McDaniel et al. | |
| 9,587,048 B2 | 3/2017 | Praetorius et al. | |
| 9,598,513 B2 | 3/2017 | Yu et al. | |
| 9,796,798 B2 | 10/2017 | Praetorius et al. | |
| 2003/0007083 A1 | 1/2003 | Rossi et al. | |
| 2003/0130111 A1 * | 7/2003 | Shih | C08F 10/00 502/150 |
| 2003/0162917 A1 * | 8/2003 | Shih | C08F 10/00 526/129 |
| 2003/0203808 A1 * | 10/2003 | Shih | C08F 110/02 502/103 |
| 2003/0204032 A1 * | 10/2003 | Shih | C08F 4/606 526/72 |
| 2003/0224927 A1 * | 12/2003 | Shih | C08F 10/00 502/103 |
| 2003/0225225 A1 * | 12/2003 | Shih | C08F 10/00 526/127 |
| 2004/0026324 A1 | 2/2004 | Luca | |
| 2005/0153830 A1 | 7/2005 | Jensen et al. | |
| 2005/0192177 A1 | 9/2005 | Roger et al. | |
| 2005/0272886 A1 | 12/2005 | Cann et al. | |
| 2006/0063666 A1 * | 3/2006 | Rohde | C08F 210/16 502/309 |
| 2007/0034549 A1 | 2/2007 | Elomari | |
| 2008/0038161 A1 | 2/2008 | Marti et al. | |
| 2011/0201768 A1 | 8/2011 | Benham et al. | |
| 2013/0137839 A1 | 5/2013 | Yu et al. | |
| 2013/0144017 A1 | 6/2013 | McDaniel et al. | |
| 2013/0225772 A1 * | 8/2013 | Willocq | C08F 210/00 526/64 |
| 2014/0275457 A1 | 9/2014 | McDaniel et al. | |
| 2014/0295178 A1 | 10/2014 | Watanabe et al. | |
| 2015/0065667 A1 | 3/2015 | Cheng et al. | |
| 2015/0203614 A1 | 7/2015 | Yu et al. | |
| 2017/0037158 A1 | 2/2017 | Yu et al. | |
| 2017/0080406 A1 | 3/2017 | Praetorius et al. | |
| 2017/0145124 A1 | 5/2017 | Yu et al. | |

FOREIGN PATENT DOCUMENTS

| | | |
|---|---|---|
| EP | 0085857 B1 | 8/1983 |
| EP | 0088989 A2 | 9/1983 |
| EP | 0314385 A2 | 5/1989 |
| EP | 0337365 A2 | 10/1989 |
| EP | 0339571 A1 | 11/1989 |
| EP | 0439294 A1 | 7/1991 |
| EP | 0455444 A1 | 11/1991 |
| EP | 0589643 A1 | 3/1994 |
| EP | 0882743 B1 | 12/1998 |
| EP | 0882744 A1 | 12/1998 |
| EP | 1845110 A1 | 10/2007 |
| EP | 2172490 A1 | 4/2010 |
| EP | 2447290 A1 | 5/2012 |
| EP | 2606962 A1 | 6/2013 |
| GB | 1197069 | 7/1970 |
| GB | 1369485 | 10/1974 |
| GB | 1405721 | 9/1975 |
| GB | 1415649 | 11/1975 |
| GB | 1447605 | 8/1976 |
| GB | 1575419 | 9/1980 |
| JP | 2011117006 | 6/2011 |
| KR | 1020070015410 | 2/2007 |
| WO | 2002/02652 A2 | 1/2002 |
| WO | 03033550 A1 | 4/2003 |
| WO | 2004/052948 A1 | 6/2004 |
| WO | 2005103100 A1 | 11/2005 |
| WO | 2009042149 A2 | 4/2009 |
| WO | 2009042149 A3 | 4/2009 |
| WO | 2009045215 A1 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2013082346 A3 | 6/2013 |

OTHER PUBLICATIONS

McDaniel, M. P., et al., Activation of Phillips Cr/silica catalysts IV. Mobility of Cr(VI), Journal of Catalysis, 2007, pp. 281-295, vol. 252, Academic Press, Inc.

McDaniel, M. P., et al., The State of Cr(VI) on th ePhillips Polymerization Catalyst, Journal of Catalysis, 1982, pp. 29-36, vol. 76, Academic Press, Inc.

McDaniel, M. P., et al., Activation of Phillips Cr/silica catalysts IV. Mobility of Cr(VI), Journal of Catalysis, 1982, pp. 37-47, vol. 76, Academic Press, Inc.

Foreign communication from a related application—International Search Report and Written Opinion, PCT/US2017/067485, dated Mar. 23, 2018, 11 pages.

Office Action dated Apr. 4, 2018 (74 pages), U.S. Appl. No. 14/858,512, filed Sep. 18, 2015.

Foreign communication from a counterpart application—Invitation to Pay Additional Fees and Partial Search Report, PCT/US2017/053468, dated Feb. 9, 2018, 13 pages.

Office Action dated Aug. 1, 2018 (39 pages), U.S. Appl. No. 15/495,116, filed Apr. 24, 2017.

Foreign communication from a related counterpart application—International Search Report and Written Opinion, PCT/US2018/028058, dated Jul. 24, 2018, 15 pages.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

(56) References Cited

OTHER PUBLICATIONS

Conway, Steven J., et al., "Chromia/silica-titania cogel catalysts for ethene polymerisation," J. Chem. Soc., Faraday Trans., 1989, pp. 71-78, vol. 85, No. 1.
Conway, Steven J., et al., "Chromia/silica-titania cogel catalysts for ethene polymerisation," J. Chem. Soc., Faraday Trans., 1989, pp. 79-90, vol. 85, No. 1.
Conway, Steven J., et al., "Chromia/silica-titania cogel catalysts for ethene polymerisation," J. Chem. Soc., Faraday Trans., 1989, pp. 1841-1851, vol. 85, No. 7.
Ellison, Alan, et al., "Characterisation of cr/silica catalysts," J. Chem. Soc. Faraday Trans., 1993, pp. 4393-4395, vol. 89, No. 24.
Ellison, Alan, et al., "Characterisation of modified cr-silica catalysts," Journal of Molecular Catalysis, 1994, pp. 81-86, vol. 90, Elsevier Science B.V.
Foreign communication from a related counterpart application—International Search Report, PCT/US2016/029327, dated Aug. 24, 2016, 4 pages.
Foreign communication from a related counterpart application—International Search Report and Written Opinion, PCT/US2008/011068, dated Mar. 23, 2009, 18 pages.
Foreign communication from a related counterpart application—International Preliminary Report on Patentability, PCT/US2008/011068, dated Mar. 30, 2010, 11 pages.
Foreign communication from a related counterpart application—Partial Search Report, Annex to Form PCT/ISA/206, PCT/US2012/067175, dated Apr. 12, 2013, 4 pages.
Foreign communication from a related counterpart application—International Search Report and Written Opinion, PCT/US2012/067175, dated Jun. 18, 2013, 23 pages.
Foreign communication from a related counterpart application—International Preliminary Report on Patentability, PCT/US2012/067175, dated Jun. 3, 2014, 16 pages.
Foreign communication from a related counterpart application—International Search Report and Written Opinion, PCT/US2012/064986, dated Jan. 25, 2013, 8 pages.
Foreign communication from a related counterpart application—International Preliminary Report on Patentability, PCT/US2012/064986, dated Jun. 3, 2014, 5 pages.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.
McDaniel, M. P., et al., "The activation of the phillips polymerization catalyst," Journal of Catalysis, 1983, pp. 118-126, vol. 82, Academic Press, Inc.
Product Information, "Ludox® SM-AS Colloidal Silica," 2005, W. R. Grace & Co.—Conn., 2 pages.
Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.
Pullukat, Thomas J., et al., "Titanium modified chromium catalysts for ethylene polymerization," Symposium on Transition Metal Catalysts Polymerization, Michigan Molecular Institute, Aug. 1981, pp. 697-712.
Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.
Yu, Youlu, et al. "SEC-MALS method for the determination of long-chain branching and long-chain branching distribution in polyethylene," Polymer, 2005, pp. 5165-5182, vol. 46, Elsevier Ltd.
Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.
Filing receipt and specification for patent application entitled "Methods of Preparing a Catalyst," by Max P. McDaniel, et al., filed Sep. 30, 2016 as U.S. Appl. No. 15/281,538.
Foreign communication from a related counterpart application—International Search Report & Written Opinion, PCT/US2016/051902, dated Feb. 13, 2017, 14 pages.
Notice of Allowance dated Dec. 19, 2017 (12 pages), U.S. Appl. No. 15/281,538, filed Sep. 30, 2017.
Office Action (Restriction Requirement) dated Aug. 14, 2017 (7 pages), U.S. Appl. No. 15/298,540, filed Oct. 20, 2016.
Office Action (Restriction Requirement) dated Aug. 11, 2017 (7 pages), U.S. Appl. No. 15/425,646, filed Feb. 6, 2017.
Office Action dated Sep. 13, 2017 (35 pages), U.S. Appl. No. 15/281,538, filed Sep. 30, 2016.
Office Action dated Nov. 8, 2017 (36 pages), U.S. Appl. No. 15/298,540, filed Oct. 20, 2016.
Notice of Allowance dated Nov. 15, 2017 (37 pages), U.S. Appl. No. 15/425,646, filed Feb. 6, 2017.
Niemanstverdriet, J.W., "Spectroscopy in Catalysis: An Introduction," Jul. 11, 2008, 3rd Edition, pp. 251-295, Section 9.5, Wiley-VCH.
Filing receipt and specification for patent application entitled "Methods of Preparing a Catalyst," by Eric Schwerdtfeger, at al., filed Apr. 24, 2017 as U.S. Appl. No. 15/495,116.
Filing receipt and specification for patent application entitled "Methods of Preparing a Catalyst Utilizing Hydrated Reagents," by Max McDaniel, et al., filed Nov. 17, 2017 U.S. Appl. No. 15/816,131.
Filing receipt and specification for patent application entitled "Methods of Preparing a Catalyst," by Max McDaniel, et al., filed Nov. 17, 2017 as U.S. Appl. No. 15/816,145.
Filing receipt and specification for provisional application entitled "Methods of Preparing a Catalyst," by Max McDaniel, et al., filed Dec. 29, 2016 as U.S. Appl. No. 62/440,188.
Iler, Ralph K., "The Chemistry of Silica: Solubility, Polymerization, Colloid and Surface Properties and Biochemistry of Silica," 1979, 1 page, Wiley.

\* cited by examiner

METHODS OF PREPARING A CATALYST

CROSS-REFERENCE TO RELATED APPLICATIONS

The present application is a non-provisional of and claims priority to U.S. Provisional Patent Application No. 62/440,188 filed Dec. 29, 2016 and entitled "Methods of Preparing a Catalyst," which application is incorporated by reference herein in its entirety.

TECHNICAL FIELD

The present disclosure relates to catalyst compositions. More specifically, the present disclosure relates to methods of preparing olefin polymerization catalyst compositions.

BACKGROUND

Enhancements in preparation methods for olefin polymerization catalysts can reduce the costs associated with catalyst production and improve process economics. Thus, there is an ongoing need to develop new methods of preparing olefin polymerization catalysts.

SUMMARY

Disclosed herein is a method of preparing a catalyst support comprising contacting an acid-soluble titanium-containing compound with an acid to form a first mixture; contacting the first mixture with an alkali metal silicate to form a hydrogel which has a silica content of from about 18 wt. % to about 35 wt. % based on the total weight of the hydrogel; contacting the hydrogel with an alkaline solution to form an aged hydrogel; washing the aged hydrogel to form a washed hydrogel; and drying the washed hydrogel to produce a titanium-containing-silica support wherein the support has a pore volume equal to or greater than about 1.4 $cm^3/g$.

Also disclosed herein is a method of preparing a catalyst comprising contacting an acid-soluble titanium-containing compound with an acid to form a first mixture; contacting the first mixture with an alkali metal silicate to form a hydrogel which has a silica content of from about 18 wt. % to about 35 wt. % based on the total weight of the hydrogel; contacting the hydrogel with an alkaline solution to form an aged hydrogel; washing the aged hydrogel to form a washed hydrogel; and drying the washed hydrogel to produce a titanium-containing-silica support; wherein a chromium compound is included in the method to form a chrominated-titanium-containing silica, either through cogelation of the hydrogel in the presence of a chromium-containing compound or contacting the titanium-containing-support with a chromium-containing compound and wherein the support has a pore volume equal to or greater than about 1.4 $cm^3/g$.

Also disclosed herein is a method of preparing a catalyst comprising contacting an acid-soluble titanium-containing compound with an acid to form a first mixture; contacting the first mixture with an alkali metal silicate to form a hydrogel which has a silica content of from about 18 wt. % to about 35 wt. % based on the total weight of the hydrogel; contacting the hydrogel with an alkaline solution to form an aged hydrogel; washing the aged hydrogel to form a washed hydrogel; drying the washed hydrogel to produce a titanium-containing-silica support; and impregnating the titanium-containing-support with a chromium-containing compound to form a chrominated-titanium-containing silica wherein the support has a pore volume equal to or greater than about 1.4 $cm^3/g$.

Also disclosed herein is a method of preparing a catalyst comprising contacting an acid-soluble titanium-containing compound with an acid to form a first mixture; contacting the first mixture with an alkali metal silicate to form a hydrogel which has a silica content of from about 18 wt. % to about 35 wt. % based on the total weight of the hydrogel; contacting the hydrogel with an alkaline solution to form an aged hydrogel; washing the aged hydrogel to form a washed hydrogel; and spray drying the washed hydrogel in the presence of a chromium-containing compound to produce a chrominated-titanium-containing silica wherein the support has a pore volume equal to or greater than about 1.4 $cm^3/g$.

Also disclosed herein is a method of preparing a catalyst comprising contacting an acid-soluble titanium-containing compound and a chromium-containing compound with an acid to form a first mixture; contacting the first mixture with an alkali metal silicate to form a hydrogel which has a silica content of from about 18 wt. % to about 30 wt. % based on the total weight of the hydrogel; contacting the hydrogel with an alkaline solution to form an aged hydrogel; washing the aged hydrogel to form a washed hydrogel; and drying the washed hydrogel to form a chrominated-titanium-containing silica wherein the support has a pore volume equal to or greater than about 1.4 $cm^3/g$.

DETAILED DESCRIPTION

It should be understood at the outset that although an illustrative implementation of one or more aspects are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods for the preparation of catalysts and catalyst supports. In an aspect, the catalyst support is a silica-titania (Si—Ti) support which is used to produce a polymerization catalyst such as a chromium-supported catalyst (Cr/Si—Ti). In an aspect, the present disclosure advantageously affords formation of a silica-titania hydrogel in a substantially aqueous medium during preparation of the chromium-supported catalyst. Herein such catalysts are designated hydrogel-derived aqueously titanated catalysts (HATC).

As described in detail herein, a method of the present disclosure comprises formation of a silica hydrogel support in the presence of an acid-soluble titanium-containing compound. A titanium-containing compound suitable for use in the present disclosure may be any acid-soluble compound able to release a tetravalent titanium species, a trivalent titanium species or a titanium species that can readily convert to tetravalent titanium into solution. In an aspect, the acid-soluble titanium-containing compound comprises trivalent titanium, tetravalent titanium, titania, or combinations thereof. For example, the acid-soluble titanium-containing compound can comprise tetravalent titanium such as $TiCl_4$, $TiOSO_4$, $TiBr_4$, $TiOCl_2$, $TiOBr_2$, $TiO_2$, $TiO(oxylate)_2$, or combinations thereof. Alternatively, the acid-soluble titanium-containing compound can comprise trivalent titanium such as $Ti_2(SO_4)_3$, $Ti(OAc)_3$, $Ti(oxylate)_3$, $Ti(NO_3)_3$, or combinations thereof.

As described in detail herein, chromium may be introduced to the silica support during cogellation of the hydrogel or via contact of the support with a chromium-containing compound. The chromium-containing compound may be one or more compounds comprising chromium in the hexavalent oxidation state (hereinafter Cr(VI)) or comprising a material suitable for conversion to Cr(VI). In an aspect, the chromium-containing compound comprises a water-soluble chromium compound; alternatively the chromium-containing compound comprises a hydrocarbon-soluble chromium compound.

The chromium-containing compound may be a chromium (II) compound, chromium (III) compound, or combinations thereof. Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromic fluoride, chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof. Examples of other suitable chromium-containing compounds include tertiary butyl chromate in a hydrocarbon liquid; chromium trioxide in water; chromium acetate in water; chromium nitrate in alcohol; zerovalent organochromium compounds such as pi bonded chromium complexes, for example, dicumene chromium and dibenzene chromium; or combinations thereof. Pi bonded chromium complexes are described in U.S. Pat. No. 3,976,632, which is incorporated by reference herein in its entirety.

In an aspect of the present disclosure, a method of preparing a HATC comprises contacting an acid-soluble titanium-containing compound of the type disclosed herein (which may be in the form of an aqueous solution) with an acid (which may be in the form of an aqueous solution) to form an acidic titanium-containing aqueous solution. The acid may be any acid capable of solubilizing, and being present in an amount effective to dissolve, the acid-soluble titanium compound and compatible with the other components of the HATC. In an aspect, the acid is a mineral acid such as hydrochloric acid, hydrobromic acid, sulfuric acid, nitric acid, phosphoric acid, perchloric acid, sulfamic acid, or any combination thereof. The acidic titanium-containing solution may have titanium present in an amount of from about 0.1 weight percent (wt. %) to about 10 wt. % based on the weight of the solution, alternatively from about 0.25 wt. % to about 8 wt. %, or alternatively from about 0.5 wt. % to about 6 wt. %.

A method of the present disclosure may further comprise contacting the acidic titanium-containing aqueous solution with an alkali metal silicate (which may be in the form of an aqueous solution) to form a titanium-containing silica hydrogel. Herein a "hydrogel" refers to a network of silicate chains that are insoluble in water and may be found as a colloidal gel in which water was the dispersion medium prior to gellation. The alkali metal silicate may be any compound capable of forming a hydrogel when contacted with the acidic titanium-containing solution and compatible with the other components of the HATC. In an aspect, the alkali metal silicate is sodium silicate (e.g., an aqueous sodium silicate solution). Other suitable alkali metal silicates include aqueous solutions of potassium silicate or lithium silicate. Colloidal silicas, made commercially by ion exchanging the alkali metal out can also be used.

In an aspect, the alkali metal silicate is added to the acidic titanium-containing solution so that the pH of the solution is raised and at some point the solution sets up into a hydrogel. The pH of the solution at gelation can be from about 1.5 to about 7, alternatively from about 2 to about 5, or alternatively from about 2 to about 4. Alternatively, a base such as NaOH or NH$_4$OH can also be added to raise the pH. For example, if a colloidal silicate solution is used as the silica source, then base can be added to neutralize the colloidal solution. Alternatively, an alkali metal silicate solution can be added to the titanium-containing solution to partially neutralize the acidity, and base can then be added to cause gelation.

In an aspect, the alkali metal silicate is a concentrated aqueous solution so that the resulting hydrogel contains a high concentration of silica. After gelation and washing to remove salts, the hydrogel may contain from about 18 wt. % to about 35 wt. % silica, alternatively from about 18 wt. % to about 30 wt. %, alternatively from about 20 wt. % to about 30 wt. % silica, or alternatively from about 22 wt. % to about 28 wt. % silica. The titanium-containing silica hydrogel may be formed using a continuous process, also referred to as an acid-set continuous gelation process, wherein the solution pH of the combined aqueous mixture comprising the acidic titanium-containing solution and alkali metal silicate is equal to or less than about 6, alternatively equal to or less than about 5, alternatively equal to or less than about 4, alternatively equal to or less than about 3, or alternatively from about 3 to about 6. For example, an acidic titanium-containing aqueous solution can be formed by combining an aqueous acid (e.g., sulfuric acid) and an aqueous titanium compound (e.g., titanyl sulfate) to form an acidic titanium-containing aqueous solution, and the acidic titanium-containing aqueous solution can be continuously combined with an alkali metal silicate aqueous solution (e.g., a concentrated sodium silicate aqueous solution) in a rapid mixer, from which a hydrosol is emitted onto a vat or continuous conveyor belt where it gels rapidly (e.g., within a few seconds) to form the titanium-containing silica hydrogel.

In a method of the present disclosure, the titanium-containing silica hydrogel may then be alkaline aged to form an aged titanium-containing silica hydrogel. Such alkaline aging treatment is also known as "Oswald ripening". It is a way of reinforcing the silica network, because silica is dissolved from areas of low surface energy and then re-deposited into areas of higher surface energy, such as into the crevices created by the contacting of neighboring silica primary particles. In this way the intricate substructure of the gel, which is created by the combination of billions of individual primary silica particles loosely attached, is lost. Instead these smaller particles become fused together into a more homogeneous mass. The surface area is thus lowered, the pores are opened up, and the entire framework become much stronger.

Herein alkaline ageing of the titanium-containing silica hydrogel may be carried out by contacting the titanium-containing silica hydrogel with an alkaline aqueous solution comprising one or more basic compounds (e.g., bases, buffer) having a pH of from about 8 to about 13, alternatively from about 9 to about 12, or alternatively from about 9 to about 10 at a temperature of from about 60° C. to about 90° C., alternatively from about 70° C. to about 85° C., or alternatively at about 80° C. The alkaline aqueous solution may be comprised of any components which provide a solution pH in the disclosed ranges and are compatible with the other components of the composition. For example, the alkaline aqueous solution may comprise ammonium hydroxide, potassium hydroxide, sodium hydroxide, trialkylammonium hydroxide, sodium metasilicate, tetra-alkyl ammonium hydroxide or combinations thereof. Alkaline aging of the titanium-containing silica hydrogel may be carried out for a time period sufficient to lower the surface area of the silica support to less than about 60% of the original value, alternatively to less than about 50% of the original value, alternatively to less than about 40% of the original value, or alternatively to less than about 35% of the original value of the surface area of an otherwise similar material that has not been alkaline aged. In an aspect, alkaline aging of the titanium-containing silica hydrogel is carried out for a time period of from about 1 hour to about 24 hours, or from about 2 hours to about 10 hours, or from about 3 hours to about 6 hours. Hereinafter the alkaline ageing parameters disclosed (e.g., compounds, pH, time, temperature, etc.) are collectively termed the standard alkaline ageing conditions.

A method of preparing a HATC of the type disclosed herein may further comprise washing the aged titanium-containing silica hydrogel with water and/or with any suitable compound such as ammonium salt (e.g., ammonium nitrate, etc.) or diluted acid to produce a washed titanium-containing silica hydrogel. In an aspect, the aged titanium-containing silica hydrogel is washed to reduce the alkali metal content of the silica hydrogel to some user or process desired level. Consequently, washing of the aged titanium-containing silica hydrogel may be carried out several times or until a user-desired result is achieved.

In an aspect, the method further comprises drying the washed titanium-containing silica hydrogel to form a dried hydrogel. Drying the washed titanium-containing silica hydrogel may be carried out to remove all or a portion of the aqueous solution from the composition. For example, the composition may be dried using standard techniques such as thermal treatment, spray drying, tray drying, oven drying, flash drying, or first contacting with a volatile liquid organic solvent to replace the pore water of the hydrogel with the organic liquid of lower surface tension. Examples of volatile liquid organic solvents include without limitation methyl isobutylketone, ethyl acetate, sec-butyl alcohol, n-propyl alcohol, butyraldehyde, diisobutyl ether, isopropyl acetate, 3-methyl-1-butanol, 1-pentanol, 2-pentanol, 1-hexanol or combinations thereof.

In an aspect, the washed titanium-containing silica hydrogel is dried in a temperature range of from about 25° C. to about 300° C., alternatively from about 50° C. to about 200° C., or alternatively from about 80° C. to about 150° C. and for a time of from about 0.01 min to about 10 hours, alternatively from about 0.2 min to about 5 hours, or alternatively from about 30 min to about 1 hour. Alternatively, the washed titanium-containing silica hydrogel can be dried from 1 sec to 10 sec. Hereinafter the drying parameters disclosed (e.g., compounds, time, temperature, etc.) may be collectively termed the standard drying conditions. Drying of the washed titanium-containing silica hydrogel may convert the material to a titanium-containing silica xerogel and the resultant alkaline-aged, washed, and dried titanium-containing silica xerogel is hereinafter termed a titanium-containing-silica support.

In an aspect, a method of the present disclosure further comprises contacting of the titanium-containing-silica support with a chromium-containing compound to form a chrominated-titanium-containing silica support, or more simply a metallated support. The chromium-containing compound may be contacted with the titanium-containing-silica support using any suitable methodology such as ion-exchange, incipient wetness, spray drying, pore fill, aqueous impregnation, organic solvent impregnation, melt coating, or the like.

In an aspect of the present disclosure the metallated support is optionally dried to remove solvent introduced by the addition of the chromium-containing compound. Drying of the metallated support may be carried out at temperatures ranging from about 25° C. to about 300° C., alternatively from about 50° C. to about 200° C., or alternatively from about 80° C. to about 150° C. to form a dried metallated support. In some aspects, the metallated support (or dried metallated support) may be activated via calcination by heating in an oxidizing environment to produce the HATC. For example, the metallated support (or dried metallated support) may be calcined in the presence of air at a temperature in the range of from about 400° C. to about 1,000° C., alternatively from about 500° C. to about 850° C. and for a time of from about 1 min to about 10 hours, alternatively from about 20 min to about 5 hours, alternatively from about 1 hour to about 3 hours to produce the HATC. Hereinafter the calcination parameters disclosed (e.g., time, temperature, etc.) may be collectively termed the standard calcination conditions.

In an aspect, the method of preparation of a HATC of the type disclosed herein may comprise contacting of the chromium-containing compound with one or more of the other catalyst components at any time during the HATC preparation process. In an aspect, the chromium-containing compound may be added via tergelation of the hydrogel. For example, the chromium-containing compound may be simultaneously contacted with an acidic titanium-containing solution and an alkali metal silicate (e.g., sodium silicate) to form a metallated support. In such aspects, the metallated support may be subsequently alkaline aged under standard alkaline ageing conditions to form an aged metallated support. The aged metallated support may be subsequently washed and dried under standard washing and drying conditions to form a dried metallated support. The method may further comprise calcining the dried metallated support under standard calcination conditions to form the HATC. In an alternative aspect, the chromium may be added prior to the aging step, as an aqueous solution of a chromium compound, such as $Cr(NO_3)_3$, $Cr_2(SO4)_3$, $CrO_3$, $Cr(OAc)_3$, etc.

In an alternative aspect, the chromium-containing compound may be contacted with the aged titanium-containing silica hydrogel to form an aged metallated hydrogel. The aged metallated hydrogel may be washed, dried and then calcined all under the disclosed standard conditions for such processes to form a HATC.

In an alternative aspect, the chromium-containing compound may be contacted with the washed titanium-containing silica hydrogel to form a washed metallated silica hydrogel which can be dried and then calcined, all under the disclosed standard conditions for such processes, to form an HATC.

In an alternative aspect, the chromium-containing compound may be contacted concurrent with drying the washed hydrogel to form a dried metallated hydrogel. For example, the chromium-containing compound can be added to the washed hydrogel and subsequently emitted through one or more spray dryer nozzles such that chromium is present in the resultant dried metallated hydrogel. The dried metallated hydrogel may be then calcined under the disclosed standard conditions for such processes to form a HATC.

In an alternative aspect, the chromium-containing compound may be contacted with the dried silica-titania support. This can be done by impregnating the support with an aqueous or organic solution of chromium, such as chromium (III) acetate dissolved in isopropanol. Alternatively, the chromium-containing compound may be contacted with the dried silica-titania support by treating the dried support with a vapor containing chromium, such as chromium (III) 2,4-pentanedionate, which sublimes during the calcination step.

In an alternative aspect, the chromium may be added after the silica-support has been calcined. Typically this is done by treatment with a non-protic organochromium compound, such as dicumene Cr(0) in toluene solution, or chromium (III) 2,4-pentanedionate in toluene or as a vapor, for example using $CrO_2Cl_2$ in hydrocarbon solution, or by treatment with $Cr(CO)_6$ vapor. The catalyst can be given an additional drying step in dry air at a temperature between 100° C. and 600° C. when Cr is deposited in this fashion.

In an aspect of the present disclosure, the HATC has a silica-titania support that possesses a surface area in the range of from about 100 $m^2$/gram to about 1000 $m^2$/gram, alternatively from about 400 $m^2$/gram to about 1000 $m^2$/gram, alternatively from about 250 $m^2$/gram to about 700 $m^2$/gram, alternatively from about 250 $m^2$/gram to about 600 $m^2$/gram, or alternatively greater than about 250 $m^2$/gram. The silica-titania support may be further characterized by a pore volume of greater than about 1.0 $cm^3$/gram, alternatively greater than about 1.4 $cm^3$/gram, alternatively greater than about 1.5 $cm^3$/gram, or alternatively greater than about 1.7 $cm^3$/gram. In an aspect of the present disclosure, the silica-titania support is characterized by a pore volume ranging from about 1.0 $cm^3$/gram to about 2.5 $cm^3$/gram. The silica-titania support may be further characterized by an average particle size of from about 10 microns to about 500 microns, alternatively about 25 microns to about 300 microns, or alternatively about 40 microns to about 150 microns. Generally, the average pore size of the silica-titania support ranges from about 10 Angstroms to about 1000 Angstroms. In one aspect of the present disclosure, the average pore size of the silica-titania support material is in the range of from about 50 Angstroms to about 500 Angstroms, while in yet another aspect of the present disclosure the average pore size ranges from about 75 Angstroms to about 350 Angstroms. The silica-titania support may contain greater than about 50 percent (%) silica, alternatively greater than about 80% silica, or alternatively greater than about 95% silica by weight of the silica-titania support.

In an aspect of the present disclosure, the HATC has titanium present in an amount of from about 0.01 wt. % to about 10 wt. % titanium by weight of the HATC, alternatively from about 0.5 wt. % to about 5 wt. %, alternatively from about 1 wt. % to about 4 wt. %, or alternatively from about 2 wt. % to about 4 wt. %. In another aspect of the present disclosure, the amount of titanium in the HATC may range from about 1 wt. % to about 5 wt. %. Herein, the percentage titanium refers to the final weight percent titanium associated with the HATC by total weight of the HATC after all processing steps (e.g., after final activation via calcination).

In an aspect of the present disclosure, the HATC has chromium present in an amount of about 0.01 wt. % to about 10 wt. %, alternatively from about 0.5 wt. % to about 5 wt. %, alternatively from about 1 wt. % to about 4 wt. %, or alternatively from about 2 wt. % to about 4 wt. %. In another aspect of the present disclosure, the amount of chromium present in the HATC may range from about 1 wt. % to about 5 wt. %. Herein, the percentage chromium refers to the final weight percent chromium associated with the HATC by total weight of the HATC after all processing steps (e.g., after final activation via calcination).

During catalyst production, materials such as highly reactive volatile organic compounds (HRVOC) may be emitted. HRVOCs play a role in the formation of ozone in ozone nonattainment areas, i.e., areas that do not meet the Environmental Protection Agency's air quality standards for ground-level ozone. In an aspect of the present disclosure, an olefin polymerization catalyst prepared as disclosed herein (i.e., HATC) results in a reduction in the level of HRVOCs produced during the olefin polymerization catalyst preparation. For example, the HRVOCs may comprise hydrocarbons, aromatic compounds, alcohols, ketones, or combinations thereof. In an aspect of the present disclosure, the HRVOCs comprise alkenes, alternatively propylene, butene, ethylene, or combinations thereof. In an aspect, emissions of HRVOCs from olefin polymerization catalysts prepared as disclosed herein (i.e., HATCs) are from about 0 wt. % to about 1 wt. % based on the total weight of the silica, alternatively less than about 1 wt. %, alternatively less than about 0.5 wt. %, or alternatively less than about 0.1 wt. %. In an aspect of the present disclosure, the HRVOC emissions of olefin compounds such as propylene, ethylene, butenes, and other hydrocarbons are less than about 0.5 wt. %, alternatively less than about 0.25 wt. %, or alternatively less than about 0.1 wt. % based on the total weight of silica in the HATC.

Alternatively, another way of gauging potential emissions is by the total amount of carbon left on the catalyst after drying. Catalysts made according to the precepts disclosed herein are noteworthy in that these materials have little or no residual carbon. These catalysts (i.e., HATCs) may be characterized as having less than about 1 wt. % carbon left on the support after drying, or alternatively less than about 0.7 wt. %, alternatively less than about 0.5 wt. %, alternatively less than about 0.3 wt. %, or alternatively less than about 0.1 wt % residual carbon based on the total weight of carbon present in the catalyst prior to drying.

Carbon is also important because it determines the amount of heat release, or exotherm, during the calcination step, where the carbon is burned. Such exotherms can damage the catalyst if the temperature spike is too high when the carbon starts to burn. The catalysts of this disclosure are noteworthy in having very little exotherm during activation. HATCs of the type disclosed herein can be characterized as having an exotherm, or temperature spike upon ignition, of less than about 200° C. Alternatively the exotherm for HATCs of the type disclosed herein are less than about 100° C., alternatively less than about 50° C., or alternatively less than about 10° C.

The catalysts of the present disclosure (i.e., HATCs) are suitable for use in any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an aspect, any arrangement and/or any combination of reactors may be employed to produce the polymer of the present disclosure.

According to one aspect, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another aspect, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the HATCs prepared as described herein. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

Examples

The following examples are given as particular aspects of the disclosure and to demonstrate the practice and advantages thereof. It is understood that the examples are given by way of illustration and are not intended to limit the specification or the claims to follow in any manner.

The melt index of a polymer resin represents the rate of flow of a molten resin through an orifice of 0.0825 inch diameter when subjected to a force of 2,160 grams at 190° C. The MI values are determined in accordance with ASTM D1238. Further, the high load melt index of a polymer resin represents the rate of flow of a molten resin through an orifice of 0.0825 inch diameter when subjected to a force of 21,600 grams at 190° C. The HLMI values are determined in accordance with ASTM D1238 condition E.

A "Quantachrome Autosorb-6 Nitrogen Pore Size Distribution Instrument" was used to determine the surface area and pore volume of the supports. This instrument was acquired from the Quantachrome Corporation of Syosset, N.Y. Particle size distribution was determined by light scattering using a Leeds & Northrup Microtrac FRA instrument. A few milligrams of sample was introduced into a stream of circulating water. The particle size distribution was determined by volume weighting from the range of 0.1 to 1000 microns, using 100 channels, and assuming a spherical shape.

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

Unless otherwise stated, a small amount (0.01 to 0.10 grams normally) of the solid catalyst was first charged under nitrogen to the dry reactor. Next 1.2 liters of isobutane liquid was charged and the reactor heated up to the specified temperature, typically 109° C. unless stated otherwise. Finally ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

A silica-titania-chromia hydrogel was made according to U.S. Pat. No. 3,119,569 in which sodium silicate solution was added to an aqueous solution of $TiOSO_4$ and $Cr_2(SO_4)_3$ in dilute sulfuric acid. The amount titanyl sulfate present in the solution was enough to impart a final Ti content in the finished catalyst of 2.5 wt. %. Likewise, the amount of chromium sulfate in the solution was sufficient to produce a finished catalyst containing 1 wt. % chromium.

The pH of the acidic solution increased as sodium silicate was added, and the solution gelled at pH 6. A small amount of $NH_4OH$ was added to bring the aging pH to 8, where it was held for 3 hours at 80° C. Afterward the gel was given a series of 7 wash treatments in water, which was drained off after each step. After all the excess water was drained away, the final hydrogel had silica content of 12 wt. % with most of the remainder of the mass being water.

This hydrogel was then divided into three parts which were subsequently dried by three different methods. In each case the resulting catalyst was finally calcined in dry air at 870° C. for three hours. In comparative example 1 the hydrogel sample was simply dried in a vacuum oven at 100° C. for 18 hours. In comparative example 2, the hydrogel sample was spray-dried at about 120° C. In comparative example 3, the hydrogel sample was first boiled in butyl acetate to remove the water as an azeotrope, then the butyl acetate still in the pores of the gel was driven out by drying in a vacuum oven at 100° C. for 18 hours. After calcination at 870° C. all three comparative catalysts were tested in a laboratory reactor at 109° C. as described above. The physical properties of these catalysts, and the polymerization results, are shown in Table 1 below.

In another common approach used to produce comparative example 4, a commercial catalyst was obtained from W.R. Grace under the trade name of HA30W, having an average particle size of 100 microns, a chromium content of 1 wt. %, no titanium, a pore volume of 1.6 mL/g, and a surface area of about 300 m$^2$/g. This silica was dried at 200° C. overnight, and then slurried in heptane, to which was added titanium tetraisopropoxide in an amount to render the catalyst 2.5 wt. % titanium. The heptane was then evaporated and the amount of carbon left on the catalyst was determined by combustion analysis. Finally, the catalyst was calcined at 870° C., during which an exotherm of 250° C. was observed starting at about 270° C. During the activation the catalyst produced a significant amount of 1-olefin (specifically propylene) HRVOC. This catalyst was also tested in laboratory polymerization and the resultant data is again listed in Table 1 as comparative example 4.

A series of catalysts of the type disclosed (HTACs 1-3) herein were then made following the same procedure described above to make a tergelled Cr/silica-titania hydrogel. However, in these experiments, not as much water was added to dilute the sodium silicate solution. This resulted in more concentrated alkaline silicate solutions to which the acidic titanyl sulfate solution was then added as noted above to cause gelation. The resulting hydrogels made were also more concentrated, that is, they contained a higher percentage of silica. The actual values are listed in Table 1 below. Gelation also occurred at a lower pH because of the higher solids concentration, as described in "The Chemistry of Silica, Solubility, Polymerization" by Ralph K. Ihler. Consequently the resulting hydrogel of the present disclosures contained 25 wt. % silica, twice that of the comparative catalysts. Otherwise, the process was repeated exactly like that described for the comparative catalysts. The physical properties of the HATCs and the laboratory polymerization results obtained, are listed again in Table 1, where the two preparations can be compared.

Notice that for each drying method, the HATCs produced a higher pore volume than the comparative catalyst. The is because the higher silica content in the hydrogel provides a more sturdy framework that can better resist shrinkage during drying by the high surface tension of water in the pores. This high pore volume is desirable because it in turn produced a more active catalyst, and higher melt index polymer, both of which favor higher production rates in a commercial polymerization plant.

TABLE 1

| | Comparative | | | | Inventive | | |
| --- | --- | --- | --- | --- | --- | --- | --- |
| | Sample | | | | | | |
| Process | 1 | 2 | 3 | 4* | 1 | 2 | 3 |
| Gelation pH | 6 | 6 | 6 | 2 | 2 | 2 | 2 |
| Aging pH | 8 | 8 | 8 | 10 | 8 | 8 | 8 |
| % Silica in gel | 12% | 12% | 12% | 25% | 25% | 25% | 25% |
| Drying method | Vac. Oven | Spray Dried | Azeotroped | Spray Dried | Vac. Oven | Spray Dried | Azeotroped |
| Surface Area m2/g | 400 | 460 | 450 | 450 | 420 | 440 | 470 |
| Pore Volume, mL/g | 0.85 | 0.92 | 2.53 | 1.61 | 1.33 | 1.67 | 2.87 |
| Activity, gPE/g/h | 2300 | 3600 | 5200 | 4650 | 3800 | 4900 | 5700 |
| Melt Index | 0.83 | 1.21 | 5.35 | 4.32 | 3.21 | 4.87 | 7.42 |
| 1-Olefin HRVOC, wt % | 0 | 0 | 0.3% | 1.6% | 0.0% | 0.0% | 0.3% |
| % Carbon after drying | 0 | 0 | 0.8% | 4.7% | 0.0% | 0.0% | 0.7% |
| Exotherm, deg C. | 0 | 0 | 85° C. | 340° C. | 0 | 0 | 82° C. |

*Titanium added by organic surface coating, not cogellation

ADDITIONAL DISCLOSURE

The following enumerated aspects of the present disclosures are provided as non-limiting examples.

A first aspect which is a method of preparing a catalyst support comprising:

contacting an acid-soluble titanium-containing compound with an acid to form a first mixture;

contacting the first mixture with an alkali metal silicate to form a hydrogel which has a silica content of from about 18 wt. % to about 35 wt. % based on the total weight of the hydrogel;

contacting the hydrogel with an alkaline solution to form an aged hydrogel;

washing the aged hydrogel to form a washed hydrogel; and drying the washed hydrogel to produce a titanium-containing-silica support wherein the support has a pore volume equal to or greater than about 1.4 cm$^3$/g.

A second aspect which is a method of preparing a catalyst comprising:

contacting an acid-soluble titanium-containing compound with an acid to form a first mixture;

contacting the first mixture with an alkali metal silicate to form a hydrogel which has a silica content of from about 18 wt. % to about 35 wt. % based on the total weight of the hydrogel;

contacting the hydrogel with an alkaline solution to form an aged hydrogel;

washing the aged hydrogel to form a washed hydrogel; and drying the washed hydrogel to produce a titanium-containing-silica support;

wherein a chromium compound is included in the method to form a chrominated-titanium-containing silica, either through cogelation of the hydrogel in the presence of a chromium-containing compound or contacting the titaniumcontaining-support with a chromium-containing compound and wherein the support has a pore volume equal to or greater than about 1.4 cm$^3$/g.

A third aspect which is a method of preparing a catalyst comprising:
contacting an acid-soluble titanium-containing compound with an acid to form a first mixture;
contacting the first mixture with an alkali metal silicate to form a hydrogel which has a silica content of from about 18 wt. % to about 35 wt. % based on the total weight of the hydrogel;
contacting the hydrogel with an alkaline solution to form an aged hydrogel;
washing the aged hydrogel to form a washed hydrogel;
drying the washed hydrogel to produce a titanium-containing-silica support; and
impregnating the titanium-containing-support with a chromium-containing compound to form a chrominated-titanium-containing silica wherein the support has a pore volume equal to or greater than about 1.4 cm$^3$/g.

A fourth aspect which is a method of preparing a catalyst comprising:
contacting an acid-soluble titanium-containing compound with an acid to form a first mixture;
contacting the first mixture with an alkali metal silicate to form a hydrogel which has a silica content of from about 18 wt. % to about 35 wt. % based on the total weight of the hydrogel;
contacting the hydrogel with an alkaline solution to form an aged hydrogel;
washing the aged hydrogel to form a washed hydrogel; and
spray drying the washed hydrogel in the presence of a chromium-containing compound to produce a chrominated-titanium-containing silica wherein the support has a pore volume equal to or greater than about 1.4 cm$^3$/g.

A fifth aspect which is a method of preparing a catalyst comprising:
contacting an acid-soluble titanium-containing compound and a chromium-containing compound with an acid to form a first mixture;
contacting the first mixture with an alkali metal silicate to form a hydrogel which has a silica content of from about 18 wt. % to about 35 wt. % based on the total weight of the hydrogel;
contacting the hydrogel with an alkaline solution to form an aged hydrogel;
washing the aged hydrogel to form a washed hydrogel; and
drying the washed hydrogel to form a chrominated-titanium-containing silica wherein the support has a pore volume equal to or greater than about 1.4 cm$^3$/g.

A sixth aspect which is the method of any of the first through fifth aspects wherein the contacting the first mixture with an alkali metal silicate to form a hydrogel is continuous.

A seventh aspect which is the method of any of the first through sixth aspects wherein the contacting the first mixture with an alkali metal silicate to form a hydrogel occurs at a pH of less than about 4.

An eighth aspect which is the method of any of the second through fifth aspects further comprising calcination of the chrominated-titanium-containing silica at a temperature of from about 400° C. to about 1,000° C. to form a polymerization catalyst.

A ninth aspect which is the method of the eighth aspect wherein the polymerization catalyst has a surface area of from about 400 m$^2$/g to about 1000 m$^2$/g.

A tenth aspect which is the method of any of the eighth through ninth aspects wherein the polymerization catalyst has pore volume equal to or greater than about 1.7 cm$^3$/g.

An eleventh aspect which is the method of any of the first through tenth aspects wherein the acid-soluble titanium-containing compound comprises trivalent titanium, tetravalent titanium, titania, or combinations thereof.

A twelfth aspect which is the method of the eleventh aspect wherein the tetravalent titanium comprises TiCl$_4$, TiOSO$_4$, TiBr$_4$, TiOCl$_2$, TiOBr$_2$, TiO$_2$, TiO(oxylate)$_2$, or combinations thereof.

A thirteenth aspect which is the method of the eleventh aspect wherein the trivalent titanium comprises Ti$_2$(SO$_4$)$_3$, Ti(OAc)$_3$, Ti(oxylate)$_3$, Ti(NO$_3$)$_3$, or combinations thereof.

A fourteenth aspect which is the method of any of the second through thirteenth aspects wherein the chromium-containing compound comprises chromium trioxide, chromium acetate, chromium nitrate, chromium sulfate, tertiary butyl chromate, a diarene chromium (0) compound, biscyclopentadienyl chromium(II), chromium (III) acetylacetonate, or combinations thereof.

A fifteenth aspect which is the method of any of the eighth through tenth aspects wherein the chromium is present in an amount of from about 0.01 wt. % to about 10 wt. % based on the total weight of the polymerization catalyst.

A sixteenth aspect which is the method of any of the eighth through tenth and the fifteenth aspects wherein the titanium is present in an amount of from 0.1 wt. % to about 10 wt. % based on the total weight of the polymerization catalyst.

A seventeenth aspect which is the method of any of the first through sixteenth aspects wherein the alkali metal silicate comprises sodium silicate.

An eighteenth aspect which is the method of any of the first through seventeenth aspects wherein the acid comprises a mineral acid.

A nineteenth aspect which is the method of any of the first through eighteenth aspects wherein the alkaline solution comprises sodium hydroxide, ammonium hydroxide, sodium metasilicate, tetra-alkyl ammonium hydroxide, potassium hydroxide or combinations thereof.

A twentieth aspect which is the method of any of the first through nineteenth aspects wherein contacting with an alkaline solution occurs for a time period of from about 1 hour to about 24 hours.

A twenty-first aspect which is the method of any of the first through twentieth aspects wherein the washed hydrogel has an alkali metal present in an amount of less than about 0.5 wt. % based on the total weight of washed hydrogel.

A twenty-second aspect which is the method of any of the first through twenty-first aspects wherein the washed hydrogel is dried by spray drying, flash drying, or oven drying.

A twenty-third aspect which is the method of any of the first through twenty-second aspects wherein an emission of a highly-reactive volatile organic compound during calcination is an amount of from about 0 wt. % to about 0.5 wt. % based on the weight of the silica.

A twenty-fourth aspect which is the method of any of the first through twenty-third aspects wherein post-drying the support comprises less than about 0.3 wt. % carbon.

A twenty-fifth aspect which is the method of any of the first through twenty-fourth aspects wherein the exotherm during calcination of the catalyst is less than about 100° C.

A twenty-sixth aspect which is the method according to any of the first through fifth aspects wherein the contacting the first mixture with an alkali metal silicate to form a hydrogel occurs at a pH of less than about 4 and further comprising calcination of the chrominated-titanium-containing silica at a temperature of from about 400° C. to about 1,000° C. to form a polymerization catalyst, where the pore volume of the catalyst is greater than an otherwise similar comparative catalyst prepared by contacting the first mixture with an alkali metal silicate to form a comparative hydrogel at a pH of greater than about 4 and wherein the comparative hydrogel has a silica content of less than about 18 wt. % based on the total weigh of the comparative hydrogel.

A twenty-seventh aspect which is the method according to any of the first through fifth aspects wherein the contacting the first mixture with an alkali metal silicate to form a hydrogel occurs at a pH of less than about 4 and further comprising calcination of the chrominated-titanium-containing silica at a temperature of from about 400° C. to about 1,000° C. to form a polymerization catalyst, where the activity of the catalyst is greater than an otherwise similar comparative catalyst prepared by contacting the first mixture with an alkali metal silicate to form a comparative hydrogel at a pH of greater than about 4 and wherein the comparative hydrogel has a silica content of less than about 18 wt. % based on the total weigh of the comparative hydrogel.

A twenty-eighth aspect which is an ethylene polymer prepared by contacting the catalyst of any of the eighth through tenth aspects with ethylene and an optional comonomer under conditions suitable for the formation of the ethylene polymer.

While various aspects have been shown and described, modifications thereof can be made by one skilled in the art without departing from the spirit and teachings of the invention. The aspects described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the aspects of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing a catalyst support comprising:
   contacting an acid-soluble titanium-containing compound with an acid to form a first mixture;
   contacting the first mixture with an alkali metal silicate to form a hydrogel which has a silica content of from about 18 wt. % to about 35 wt. % based on the total weight of the hydrogel;
   contacting the hydrogel with an alkaline solution to form an aged hydrogel;
   washing the aged hydrogel to form a washed hydrogel; and
   drying the washed hydrogel to produce a titanium-containing-silica support wherein the support has a pore volume equal to or greater than about 1.4 cm$^3$/g.

2. A method of preparing a catalyst comprising:
   contacting an acid-soluble titanium-containing compound with an acid to form a first mixture;
   contacting the first mixture with an alkali metal silicate to form a hydrogel which has a silica content of from about 18 wt. % to about 35 wt. % based on the total weight of the hydrogel;
   contacting the hydrogel with an alkaline solution to form an aged hydrogel;
   washing the aged hydrogel to form a washed hydrogel; and
   drying the washed hydrogel to produce a titanium-containing-silica support;
   wherein a chromium compound is included in the method to form a chrominated-titanium-containing silica, either through cogelation of the hydrogel in the presence of a chromium-containing compound or contacting the titanium-containing-support with a chromium-containing compound and wherein the support has a pore volume equal to or greater than about 1.4 cm$^3$/g.

3. A method of preparing a catalyst comprising:
   contacting an acid-soluble titanium-containing compound with an acid to form a first mixture;
   contacting the first mixture with an alkali metal silicate to form a hydrogel which has a silica content of from about 18 wt. % to about 35 wt. % based on the total weight of the hydrogel;
   contacting the hydrogel with an alkaline solution to form an aged hydrogel;
   washing the aged hydrogel to form a washed hydrogel;
   drying the washed hydrogel to produce a titanium-containing-silica support; and
   impregnating the titanium-containing-support with a chromium-containing compound to form a chrominated-titanium-containing silica wherein the support has a pore volume equal to or greater than about 1.4 cm$^3$/g.

4. A method of preparing a catalyst comprising:
   contacting an acid-soluble titanium-containing compound with an acid to form a first mixture;
   contacting the first mixture with an alkali metal silicate to form a hydrogel which has a silica content of from about 18 wt. % to about 35 wt. % based on the total weight of the hydrogel;
   contacting the hydrogel with an alkaline solution to form an aged hydrogel;
   washing the aged hydrogel to form a washed hydrogel; and
   spray drying the washed hydrogel in the presence of a chromium-containing compound to produce a chrominated-titanium-containing silica wherein the support has a pore volume equal to or greater than about 1.4 cm$^3$/g.

5. A method of preparing a catalyst comprising:
contacting an acid-soluble titanium-containing compound and a chromium-containing compound with an acid to form a first mixture;
contacting the first mixture with an alkali metal silicate to form a hydrogel which has a silica content of from about 18 wt. % to about 35 wt. % based on the total weight of the hydrogel;
contacting the hydrogel with an alkaline solution to form an aged hydrogel;
washing the aged hydrogel to form a washed hydrogel; and
drying the washed hydrogel to form a chrominated-titanium-containing silica wherein the support has a pore volume equal to or greater than about 1.4 cm$^3$/g.

6. The method according to claim 1 wherein the contacting the first mixture with an alkali metal silicate to form a hydrogel is continuous.

7. The method according to claim 1 wherein the contacting the first mixture with an alkali metal silicate to form a hydrogel occurs at a pH of less than about 4.

8. The method according to claim 2 further comprising calcination of the chrominated-titanium-containing silica at a temperature of from about 400° C. to about 1,000° C. to form a polymerization catalyst.

9. The method of claim 8 wherein the polymerization catalyst has a surface area of from about 400 m$^2$/g to about 1000 m$^2$/g.

10. The method of claim 8 wherein the polymerization catalyst has pore volume equal to or greater than about 1.7 cm$^3$/g.

11. The method of claim 1 wherein the acid-soluble titanium-containing compound comprises trivalent titanium, tetravalent titanium, titanic, or combinations thereof.

12. The method of claim 11 wherein the tetravalent titanium comprises TiCl$_4$, TiOSO$_4$, TiBr$_4$, TiOCl$_2$, TiOBr$_2$, TiO$_2$, TiO(oxylate)$_2$, or combinations thereof.

13. The method of claim 11 wherein the trivalent titanium comprises Ti(SO$_4$)$_3$, Ti(OAc)$_3$, Ti(oxylate)$_3$, Ti(NO$_3$)$_3$, or combinations thereof.

14. The method of claim 2 wherein the chromium-containing compound comprises chromium trioxide, chromium acetate, chromium nitrate, chromium sulfate, tertiary butyl chromate, a diarene chromium (0) compound, biscyclopentadienyl chromium(II), chromium (III) acetylacetonate, or combinations thereof.

15. The method of claim 8 wherein the chromium is present in an amount of from about 0.01 wt. % to about 10 wt. % based on the total weight of the polymerization catalyst.

16. The method of claim 8 wherein the titanium is present in an amount of from 0.1 wt. % to about 10 wt. % based on the total weight of the polymerization catalyst.

17. The method of claim 1 wherein the alkali metal silicate comprises sodium silicate.

18. The method of claim 1 wherein the acid comprises a mineral acid.

19. The method of claim 1 wherein the alkaline solution comprises sodium hydroxide, ammonium hydroxide, sodium metasilicate, tetra-alkyl ammonium hydroxide, potassium hydroxide or combinations thereof.

20. The method of claim 1 wherein contacting with an alkaline solution occurs for a time period of from about 1 hour to about 24 hours.

21. The method of claim 1 wherein the washed hydrogel has an alkali metal present in an amount of less of than about 0.5 wt. % based on the total weight of washed hydrogel.

22. The method of claim 1 wherein the washed hydrogel is dried by spray drying, flash drying, or oven drying.

23. The method of claim 1 wherein an emission of a highly-reactive volatile organic compound during calcination is an amount of from about 0 wt. % to about 0.5 wt. % based on the weight of the silica.

24. The method of claim 1 wherein post-drying the support comprises less than about 0.3 wt. % carbon.

25. The method of claim 8 wherein the exotherm during calcination of the catalyst is less than about 100° C.

26. The method according to claim 1 wherein the contacting the first mixture with an alkali metal silicate to form a hydrogel occurs at a pH of less than about 4 and further comprising calcination of the chrominated-titanium-containing silica at a temperature of from about 400° C. to about 1,000° C. to form a polymerization catalyst, where the pore volume of the catalyst ranges from about 1.0 cm$^3$/g to about 2.5 cm$^3$/g.

27. The method according to claim 1 wherein the contacting the first mixture with an alkali metal silicate to form a hydrogel occurs at a pH of less than about 4 and further comprising calcination of the chrominated-titanium-containing silica at a temperature of from about 400° C. to about 1,000° C. to form a polymerization catalyst, where the activity of the catalyst as measured for ethylene polymerization in grams of polyethylene produced per gram catalyst per hour (g PE/g/h) is greater than about 3500.

* * * * *